July 3, 1945.　　　A. G. KANDOIAN　　　2,379,442
INSTRUMENT LANDING GUIDE SYSTEM
Filed May 11, 1942　　　3 Sheets-Sheet 1
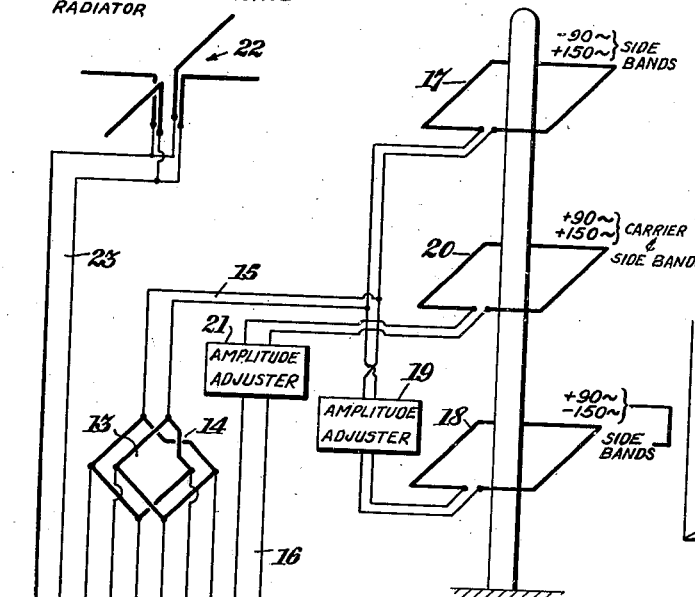
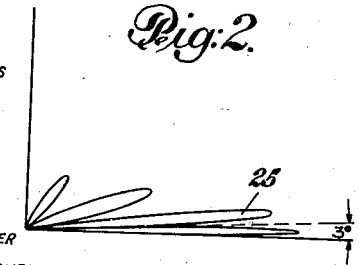
Fig. 2.
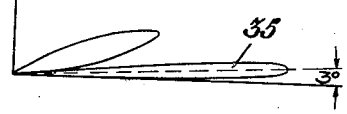
Fig. 3.
Fig. 4.
Fig. 5.
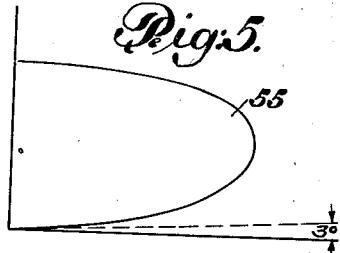
Fig. 6.
INVENTOR.
ARMIG G. KANDOIAN
BY
ATTORNEY July 3, 1945. A. G. KANDOIAN 2,379,442
INSTRUMENT LANDING GUIDE SYSTEM
Filed May 11, 1942 3 Sheets-Sheet 2

INVENTOR
ARMIG G. KANDOIAN
BY
ATTORNEY

July 3, 1945.　　　　A. G. KANDOIAN　　　　2,379,442
INSTRUMENT LANDING GUIDE SYSTEM
Filed May 11, 1942　　　3 Sheets-Sheet 3

INVENTOR
ARMIG G. KONDOIAN
BY
ATTORNEY

Patented July 3, 1945

2,379,442

UNITED STATES PATENT OFFICE 2,379,442

INSTRUMENT LANDING GUIDE SYSTEM

Armig G. Kandoian, New York, N. Y., assignor to Federal Telephone & Radio Corporation, a corporation of Delaware Application May 11, 1942, Serial No. 442,462

18 Claims. (Cl. 250—11)

This invention relates to radio beacons and more particularly to radio beacons designed to produce a landing glide path.

In order to provide a beacon for guiding an aircraft to a landing many different types of systems have been proposed. The type which gives the best positive guiding indications is one using comparison of two signals to define a course.

It is a principal object of my invention to provide a signal comparison type of glide path beacon which is simple to install and adjust for the desired angle of landing.

It is a further object of my invention to provide a glide path beacon of simple design and with a sharply defined course in which there is a minimum danger of producing false course indications.

According to a feature of my invention side band energy in which two modulating signals are in opposite phase with respect to one another is transmitted to produce at least two lobes, the position of the lobes being adjusted to provide a null at the desired landing angle and carrier frequency energy modulated with the same two signals in like phase with respect to one another being transmitted to produce a lobe overlapping the lobes on either side of the null above mentioned.

A better understanding of my invention and the objects and features thereof may be had from the particular description thereof made with reference to the accompanying drawings in which:

Fig. 1 is a diagrammatic showing of a circuit arrangement according to my invention, Figs. 2-5 inclusive are curves used in explaining the operation of my invention.

Fig. 6 is a modified circuit incorporating the features of my invention, and

Figure 8:
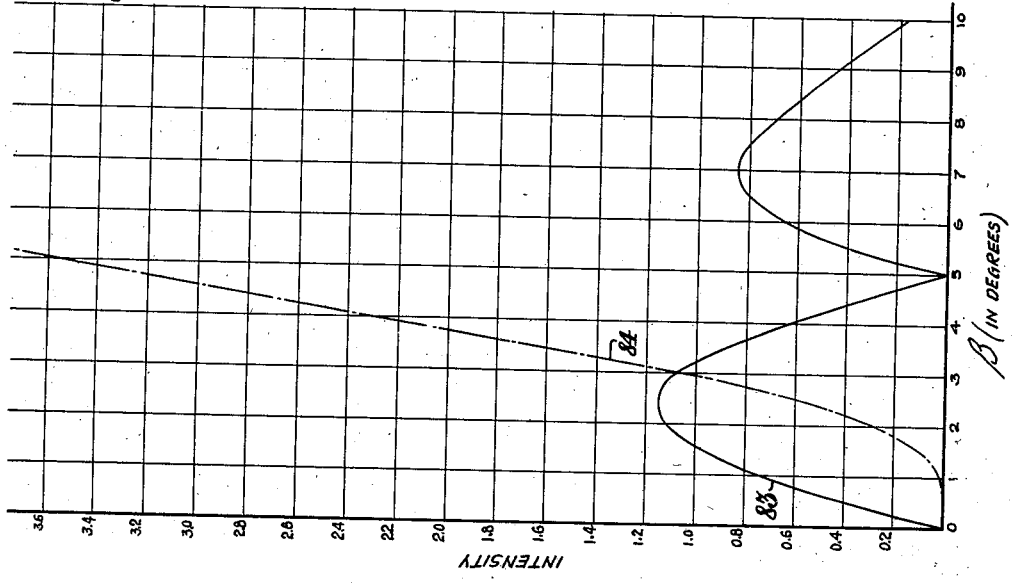
Figs. 7, 8 and 9 are curves illustrating practical examples of installation characteristics in accordance with my invention.

In Fig. 1 is shown a general circuit diagram of a radio beacon installation in accordance with my invention. In this arrangement a transmitter 10 serves as a source of carrier frequency energy. Some of the energy from this source is modulated with a distinctive signal at 11, for example 150 cycles, and another portion of the energy from 10 is modulated by a different signal at modulator 12, for example at 90 cycles. These two portions of the modulated energy are then applied to a bridge network 13 at points across the diagonal of the bridge. The bridge network 13 is provided with a transposition 14 in one arm. The modulated energy from 11 and 12 is then applied to lines 15 and 16 connected to the other diagonal plane of bridge 13. The energy fed out in line 15 will have the carrier or radio frequency energy suppressed because of the phase reversal at transposition 14, so that only side bands of the 90 and 150 cycles are fed thereover the phase relation of these side bands being substantially 180°. The energy is then applied to two spaced antenna elements 17, 18, preferably through an amplitude adjuster 19. Antenna elements 17 and 18 are preferably connected to have 180° phase relationship so that the energization at 17 can be said to be −90 cycles and +150 cycles, and at 18, +90 cycles and −150 cycles. Energy in the line 16 is such that the carrier frequency adds so that the energy supplied to antenna 20 is the carrier, and the +90 cycle and the +150 cycle energy. An amplitude adjuster 21 may be supplied to adjust the amplitude of energy to antenna 20 to any desired level.

The portion of Fig. 1 described above is sufficient for producing the glide path beacon. However, in some cases it is desirable to produce an additional effect. This may be achieved by providing an auxiliary radiating arrangement 22. This auxiliary antenna system is supplied with the carrier frequency and only one of the modulation frequencies, for example, the 150 cycle energy as shown, by means of line 23.

Antenna units 17, 18 and 20, may be of any desired type for producing horizontal radiations. A preferred type of antenna unit for this purpose is disclosed in a copending application of Andrew Alford, Serial No. 270,173, now Patent Number 2,283,897, date May 26, 1942.

The operation of the antenna system in order to provide the desired glide path beacon will now be described with reference to Figs. 2, 3, 4 and 5, showing the field of distributions from the system. In Fig. 2 is shown the radiation pattern produced by antenna units 17, 18. These antenna units are spaced a considerable distance apart so as to form a multi-lobe pattern. As is well known in such multi-lobe pattern adjacent lobes of the pattern are of opposite phase. The angular position of the lobes of Fig. 2 depend on the spacing and are preferably adjusted in energy by amplitude adjuster 19 until a null is produced at the desired landing angle. This may, for example, be three degrees as indicated in Fig. 2. This diagram as well as those shown in Figs. 3 and 4 are purely illustrative and do not represent true amplitude relationships of the lobes. A more accurate illustration thereof will be described later in connection with Figs. 7 and 8. In Fig. 3 is shown the radiation pattern produced by antenna unit 20. This may also be a multi-lobe pattern depending upon the spacing of antenna 20 with respect to the earth. The angle of a principal lobe of the radiation pattern 35 of Fig. 3, is adjusted so that this lobe overlaps the two lobes of 25 between which the desired null exists and may be adjusted so the maximum is substantially aligned with the null line of the radiation pattern 25 of Fig. 2. When these two patterns are produced simultaneously it should be recognized that the energy of the side band signals in adjacent lobes of pattern 25 are in opposite phase to one another, whereas in lobe 35 they are both in the same phase. The carrier component of the side bands of the energy fed to antenna 20 should be in phase quadrature with respect to the carrier components supplied to antennas 17 and 18 so that the overlapping pattern will add equally to the upper and lower lobes. Consequently when these two patterns are superimposed as shown in Fig. 4, two combined or overlapping energy lobes are produced, as shown at 45, 46, providing an equi-signal glide path at the angle corresponding with the angle of the null. Lobe 45, for example, may be produced by the upper lobe of pattern 25 combined with 35, and in this case the 90 cycle energy may be considered as balanced out, so that lobe 45 has only carrier frequency and the 150 cycle side band. Similarly, the lobe 46 represents a combination of the lower lobe of pattern 25 combined with lobe 35 and carries only the 90 cycles signal and carrier frequency. As a consequence a glide path is produced by the overlapping pattern 45, 46, aligned with the desired angle of landing.

Antenna units 17 and 18, as well as antenna unit 20, may be of any desired type so long as they produce the multi-lobe pattern which may be adjusted in angle to achieve the desired glide path adjustment. In order or practice the principles as disclosed in my invention, it is necessary that a plurality of lobes produced by loops 17, 18 be adjusted to have a null aligned with the desired glide angle, and that a lobe from loop 20 be positioned so that it has substantial radiation along the direction of null.

Since patterns 25 and 35 are both multi-lobe patterns, there may be other false courses produced at steeper angles with respect to the earth. Such false courses may be undesired and may lead to accidents if the matter is not taken care of. In order to prevent such trouble, I may provide an auxiliary radiator 22, adjusted to radiate vertically energy distinguished by one of the side bands only. This arrangement is preferably adjusted so that the entire effective radiation is above the glide path angle, as shown by pattern 55 of Fig. 5. Since this pattern 55 carries only one of the side band signals and is made relatively strong compared to the lobes in the area above the glide path angle, it is clear that at all points above the glide path angle one of the modulation signals will predominate, and no equi-signal course will be produced in this area. Antenna 22 may be of any desired form and as shown in Fig. 1, is a pair of cross-dipole units. It is known that this type of antenna, as well as other types can be adjusted to produce the desired radiation pattern, such as shown at 55.

While in Fig. 1 is shown one form of beacon incorporating the features of my invention using continuously modulating signals it is often desirable to use a simpler system with keying instead of the continuous signals. Fig. 6 illustrates, by way of example such a system.

In this figure two antennae 17a, 18a are provided to produce one pattern corresponding to 25 of Fig. 2. The antenna unit 20a produces a pattern corresponding to the curves 35 overlapping in space the curves 25. The combined pattern with distinctive overlapping fields 45, 46 is produced by reversing the phase of energy supplied to antenna units 17a, 18a and unit 20a with respect to one another at keying frequency. This reversal may be accomplished by keying device 60 operating key 61 to reverse the phase of energy from source 10a supplied to antenna unit 20a. It is clear that since relative phase reversal is all that is necessary the energy supplied to units 17a, 18a could as well be reversed instead.

Amplitude adjusting devices 19a and 21a may be provided if desired as illustrated. It should further be understood that an auxiliary radiator similar to 22 of Fig. 1 may be used with the system of Fig. 6 if desired.

Although the principles of my invention are clear from the above descriptions an example or two will serve to better illustrate the practical application thereof.

Taking any antenna beacon the radiation at a vertical angle $\beta$ the radiation equation will have the general form:

$$F(\beta) = f_1(\beta) \pm f_2(\beta) \quad (1)$$

where $f_1(\beta)$ = radiation from one unit, here the middle antenna 20 or 20a, and $f_2(\beta)$ = the radiation from the other unit, here antenna 17, 18 or 17a, 18a.

Further $f_2(\beta)$ must be equal to zero at the desired angle so that the course will be established at that angle. Radiation from 17 or 17a $$= 2A \sin(h_1 \sin \beta) \quad (2)$$

where A = the amplitude of current in the antenna and $h_1$ = height of the antenna above ground. Radiation from 18 or 18a $$= 2B \sin(h_2 \sin \beta) \quad (3)$$

where B = the current in 18, and $h_2$ = height of 18 above ground.

The total radiation $$f_2(\beta) = 2A \sin(h_1 \sin \beta) + 2B(\sin h_2 \beta) \quad (4)$$

which must be equated equal to zero at the desired angle. From this $$A = -B \frac{\sin(h_2 \sin \beta)}{\sin(h_1 \sin \beta)} \quad (5)$$

Thus it is only necessary to establish the amplitude and phase in accordance with Equation 5 to obtain the null in direction $\beta_0$.

Figure 7:
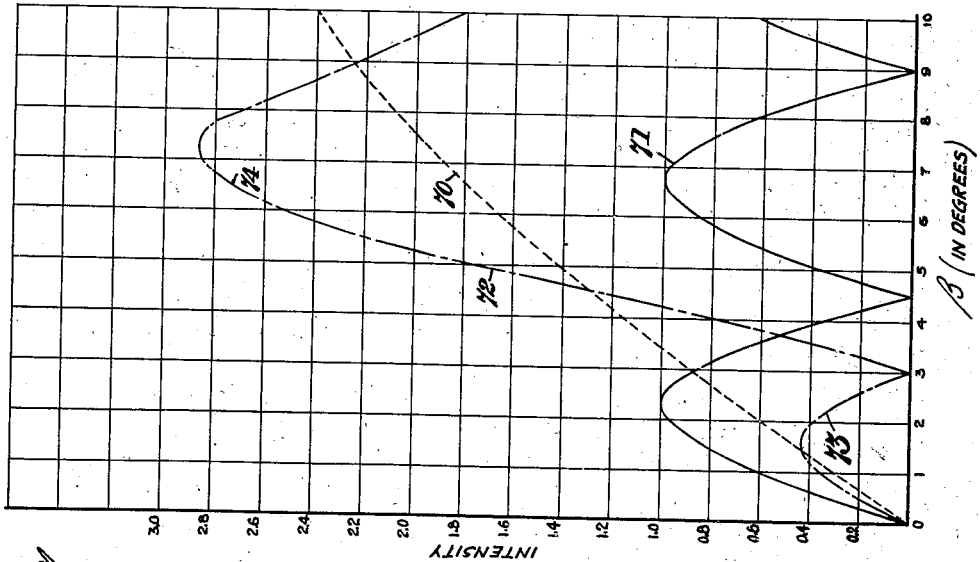

A particular case in which $\beta_0 = 3°$, $h_1 = 2300°$, $h_2 = 360°$ is shown in the curves of Figs. 7 and 8. In this example current in 17 is 1 and in 18 is 2.7. The spacing of the antenna unit 20 is made 720° above ground and the current therein 2, the phase of the energy supplied to antennas 20 or 20a is 90° with respect to the carrier component in antenna units 17, 18 or 17a, 18a.

Curves 70 and 71 show the radiation fields for units 18 and 17 respectively while curve 72 is the combined radiation pattern of the two units. It will be noted that two loops 73 and 74 occur corresponding to the first and second lobes of a pattern similar to Fig. 2. Because of ground effect, lobe 73 is considerably smaller than lobe 74.

Combination of the energy from the central antenna unit with lobes 73 and 74 results in the two curves 83, 84 respectively of Fig. 8. It is seen that these curves produce equi-signal effect at 3° the chosen glide path angle.

With the particular example given, a second course exists at approximately 15° due to a null in the $f_1(\beta)$ radiation. If an auxiliary radiator is used no harm is done. However, this null can be removed if desired by simply lowering the $f_1(\beta)$ radiator. For example, if it is brought down to $\lambda/2$ above ground no nulls will appear.

Figure 9:
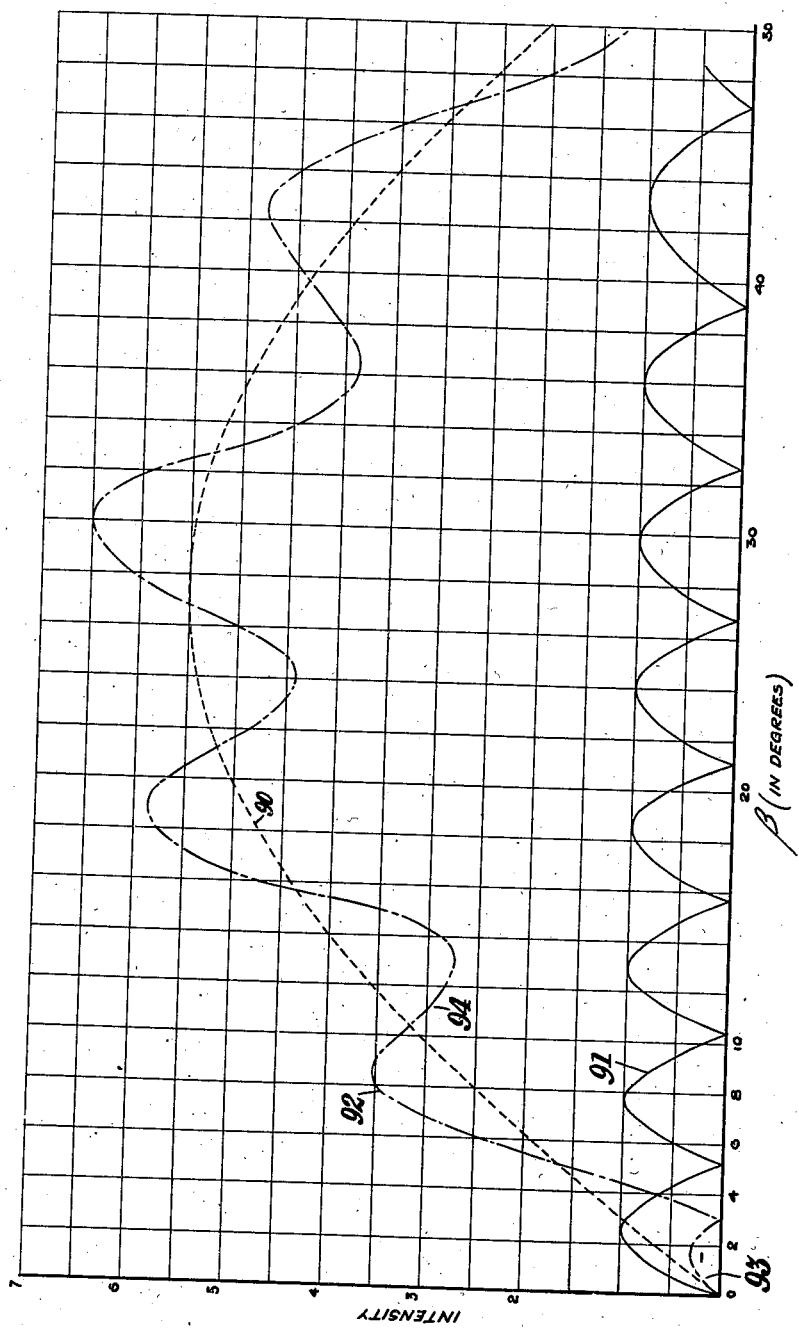

In the case of $f_2(\beta)$ a second null appears at approximately 29° which again is not troublesome if auxiliary radiation is used. However, the energization may be made at such a value that the second null or cross-over comes at such a high angle that it is not bothersome. A particular example of such a beacon is shown in the curves of Fig. 9.

In this example loops 17 and 18 are arranged at heights of 2000° and 200° respectively and the energization A and B is made in the ratio of 1:5.45.

Radiation from loop 18 is shown by curves 90 and from loop 17 by curve 91 while the combined pattern is shown at 92. This pattern has lobes 93 and 94 respectively, the latter not returning to zero until an angle higher than 50° is reached. This beacon, however, suffers from the disadvantage that the lower lobe is relatively weak with respect to the upper lobe and the efficiency of the system is thus quite low.

In the specific examples given above the antenna units have been referred to by reference number corresponding to the upper, lower and central antenna of each group. It should be understood that use of specific reference characters is made for convenience only and does not limit the disclosure to the particular structural arrangements as shown.

In the calculations given above the earth effects have been considered but parasitic effects between the central loops and the upper and lower loops have been disregarded. Any parasitic effects which are found harmful may be corrected for by phasing the energy fed the radiators so that the resultant radiation fields have the desired phase relationship. If complete compensation is desired a circuit such as illustrated in my copending application S. N. 416,163, filed October 23, 1940, may be used.

A particular advantage of radio beacons in accordance with my invention resides in the fact that generally changes in ground effect will be substantially the same for all units so that variations in ground will not cause shifting of the landing course. Preferably antenna units which have predominantly horizontally polarized energy are preferable since with such units and at low angles the earth may usually be considered as a perfectly conducting plane without causing appreciable errors in calculation.

While I have described above the principal features of my invention and the preferred construction for practicing my invention, it should be understood that this is given merely by way of example and not as a limitation on the scope of my invention. Many other antenna arrangements may be provided to achieve the broad result of my invention. To those skilled in the art many ways of producing the desired adjustment of the null, as well as the adjustment of the radiation patterns will readily occur. These various modifications are all to be considered as being within the scope of my invention.

What is claimed is:

1. A radio glide path beacon comprising a first radiation means for producing a radiation pattern having at least two lobes of radiation in a vertical plane with a minimum between said lobes, whereby energy in said lobes is oppositely phased, means for positioning said first radiation means to produce said minimum at the desired landing angle, a second radiation means for producing a radiation pattern having a lobe in the vertical plane overlapping said first two lobes, means for supplying energy to said radiation means, and means for characterizing the energy supplied to said first and second radiation means with modulations of effectively opposite phase so that energy from said last named lobe will add and subtract from said first two lobes to produce an equi-signal glide path at said desired landing angle.

2. A radio glide path beacon according to claim 1, wherein said last named means comprises means for reversing the phase of energy fed to said first and second radiation means with respect thereto at a signal frequency.

3. A radio glide path beacon according to claim 1, wherein said last named means comprises means for characterizing energy supplied to said first antenna means by two distinctive signals, applied as side bands derived from oppositely phased modulated carrier frequency components, and means for applying to said second radiation means said modulated carrier frequency.

4. A radio glide path beacon according to claim 5 further comprising a third radiation means, means for supplying to said third radiation means energy of said carrier frequency modulated with only one of said distinctive signals, and means for adjusting the energization of said third radiation means to produce a radiation pattern lying predominately above said predetermined angle.

5. A radio glide path beacon comprising a first radiation means, a source for supplying to said first radiation means carrier frequency energy modulated with two distinctive signals, a second radiation means, means for supplying from said source to said second radiation means substantially only side band energy derived from a modulated carrier distinguished by said distinctive signals, means for positioning said second radiation means to produce a multi-lobe radiation pattern having a null at the desired landing angle, means for positioning said first radiation means to produce a radiation pattern having a lobe substantially overlapping said null, whereby an equi-signal pattern is produced to define a glide path at said desired angle.

6. A radio glide path beacon according to claim 5 wherein said second radiation means comprises at least two radiation units spaced different distances above the earth.

7. A radio glide path beacon comprising a first radiation means, means for energizing said first radiation means to produce a radiation lobe extending at the desired landing angle, a second radiation means, means for energizing said second radiation means substantially in phase quadrature with respect to said first radiation means, and to produce at least two radiation lobes having a null at said desired landing angle, and means for reversing the phase of energy supplied to said first and second radiation means with respect to one another, whereby an equi-signal guide path is produced to define the desired landing angle.

8. A radio glide path beacon according to claim 7 wherein said second radiation means comprises at least two radiation units spaced different distances above the earth, and means for energizing said units in phase opposition.

9. A radio glide path beacon comprising means for producing a carrier frequency modulated with a first distinctive signal, means for producing a carrier frequency of the same frequency as that first named modulated with a second distinctive signal, a first combining means for combining said modulated carrier frequencies in phase opposition to leave only sideband energy of said first and second distinctive signals, a second combining means for combining said modulated carrier frequencies cophasially to produce a single carrier modulated with both said signal frequencies, first antenna means spaced above the surface of the earth and coupled to said first combining means, adjusting means for adjusting the energy fed to said first antenna means to produce a multi-lobe pattern having a null aligned with the desired glide path angle, whereby said null will be flanked by lobes of sideband energy having opposite phasing, a second antenna means spaced above the surface of the earth, means for supplying energy from said second combining means for said second antenna means to produce a radiation pattern having a lobe of energy substantially overlapping said null, whereby the combined effect of said last named lobe and said first named lobes serves to define a glide path at the desired angle distinguished by said carrier wave energy and substantial equality of said first and second distinctive signals.

10. A radio glide path beacon comprising a source of radio frequency energy, means for producing from said source a first carrier frequency modulated with a first distinctive signal, means for producing from said source a second carrier frequency modulated with a second distinctive signal, a first combining means for combining said modulated carrier frequencies in phase opposition to leave only sideband energy, a second combining means for combining said modulated carrier frequencies cophasially to produce a single carrier modulated with both said signal frequencies, first antenna means spaced above the surface of the earth and coupled to said first combining means, means for adjusting the energy fed to said first antenna means to produce a multi-lobe pattern having a null aligned with the desired glide path angle, whereby said null will be flanked by lobes of sideband energy having opposite phasing, a second antenna means spaced above the surface of the earth, means for supplying energy from said second combining means for said second antenna means to produce a radiation pattern having a lobe of energy substantially overlapping said null, whereby the combined effect of said last named lobe and said first named lobes serves to define a glide path at the desired angle distinguished by said carrier wave energy and substantial equality of said first and second distinctive signals.

11. A radio glide path beacon according to claim 10 wherein said two combining means constitute a reentrant bridge circuit, said first and second modulated carrier frequencies being applied at opposite apices of said bridge, said first combining means being constituted by two arms of said bridge one of which produces a phase reversal means, said second combining means comprising the other two arms of said bridge.

12. A radio glide path according to claim 10, further comprising a third antenna means, means for supplying to said third antenna means energy modulated with one of said distinctive signals, and means for adjusting said third antenna means to produce a radiation pattern entirely above said desired angle.

13. A radio glide path beacon comprising at least two antennae spaced at different distances above the surface of the earth to produce a multilobe radiation pattern having a null at the desired landing angle, a third antenna mounted above the surface of the earth to produce a radiation pattern having a lobe substantially overlying said null, a source of energy, means for supplying energy from said source to said antennae, and means for phasing the energy supplied to said third antenna substantially in phase quadrature to that supplied to said antennae and means for supplying effective modulations to said antennae producing effectively two sets of side bands of different phase and to said antenna to provide said two effective sets of side bands in like phase so that the effective side band energy from said lobe will add in part and subtract in part from the energy of the lobes flanking said null to produce an equi-signal glide path at said desired angle.

14. A radio glide path beacon according to claim 13, further comprising means for adjusting the energy supplied to said two antennae to adjust the position of said null.

15. A radio glide path beacon comprising at least two antennae spaced at different distances above the earth to produce a multi-lobe radiation pattern having a null at the desired landing angle, a third antenna mounted above the earth to produce a radiation pattern having a lobe substantially overlying said null, a source of radio frequency energy, means for supplying energy from said source in phase opposition to said first two antennae and to said third antenna, and keying means for reversing the phase of energy supplied to said first two antennae and said third antenna with respect to one another at keying frequency.

16. A radio glide path beacon comprising at least two antennae spaced at different distances above the earth to produce a multi-lobe radiation pattern having a null at the desired landing angle, a third antenna mounted above the earth to produce a radiation pattern having a lobe substantially overlying said null, a source of energy modulated with two distinctive signals to produce sidebands, means for supplying sideband energy from said signal source in substantially opposed phase relation to said two antennae, and means for supplying said modulated energy with said sidebands to said third antenna, whereby a glide path distinguished by equality of said two distinctive signals is produced along said desired angle.

17. A radio glide path beacon according to claim 16 further comprising a fourth radiation means and means for supplying to said fourth radiation means energy modulated with one of said distinctive signals only.

18. A radio glide path system in which means is provided to produce oppositely phased radiation lobes with a null between said lobes at the desired landing angle, the lobes carrying sideband energy only, and means to produce a radiation pattern having a lobe aligned with said null, said last named lobe having sideband energy and carrier frequency energy.

ARMIG G. KANDOIAN.